July 2, 1940.                J. W. GALYON                2,206,086
                        CAMERA LENS DIAPHRAGM
            Filed March 9, 1939            3 Sheets-Sheet 1
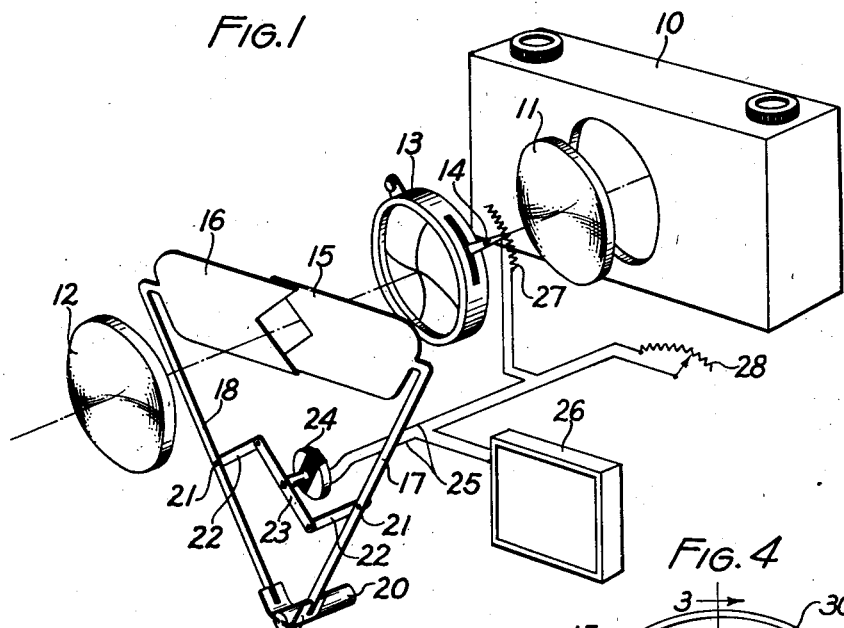
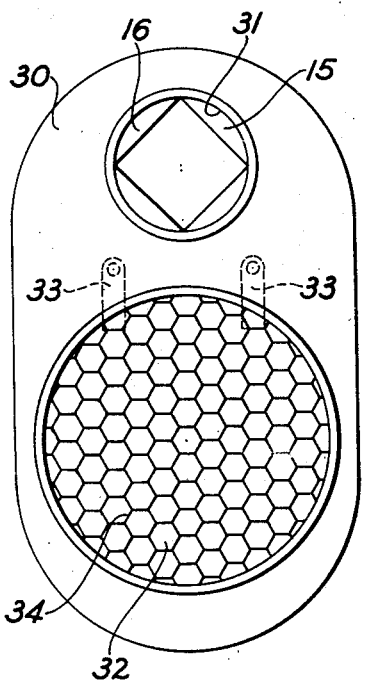
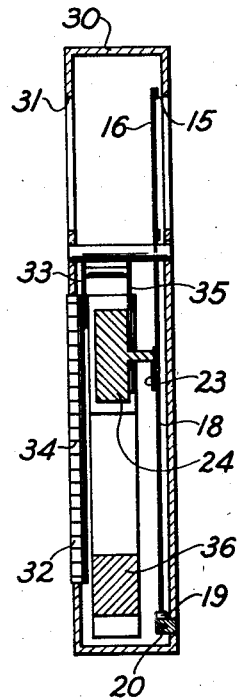
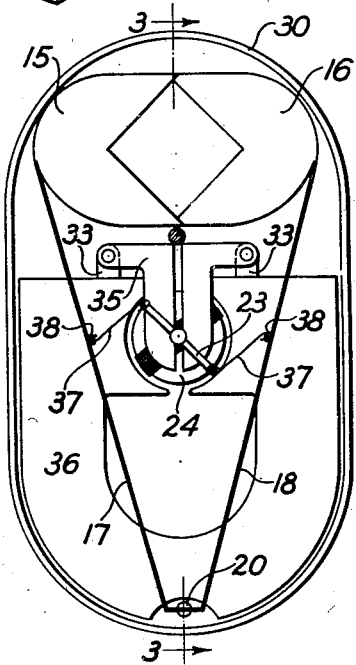
JOHN W. GALYON
    INVENTOR
BY
    ATTORNEYS July 2, 1940.  J. W. GALYON  2,206,086
CAMERA LENS DIAPHRAGM
Filed March 9, 1939  3 Sheets-Sheet 2
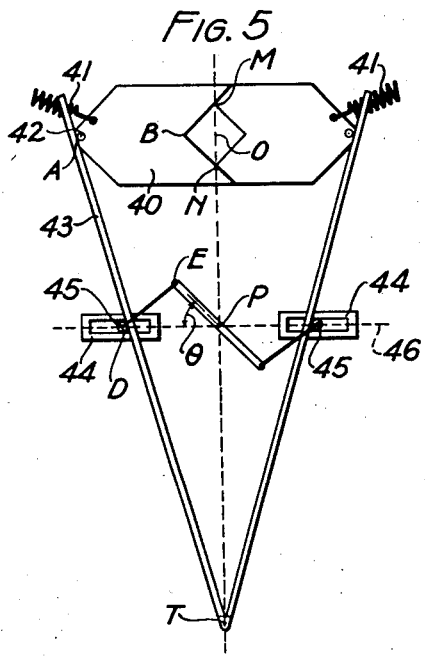
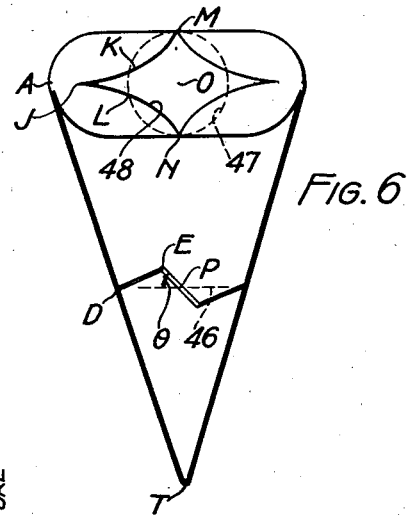
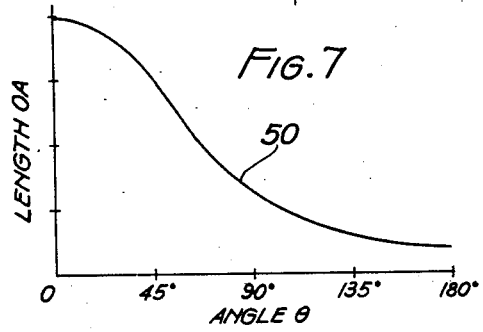
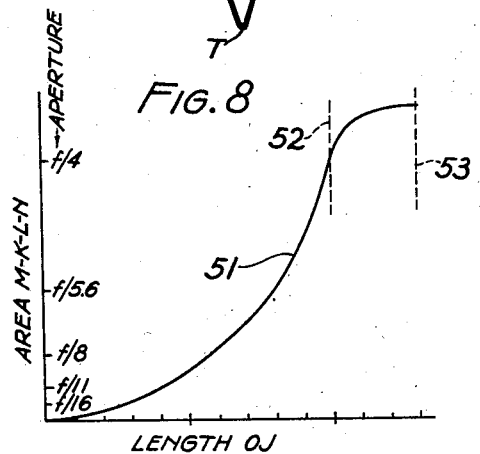
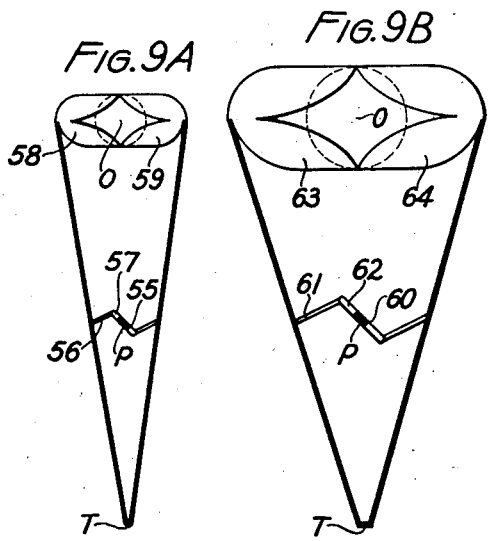
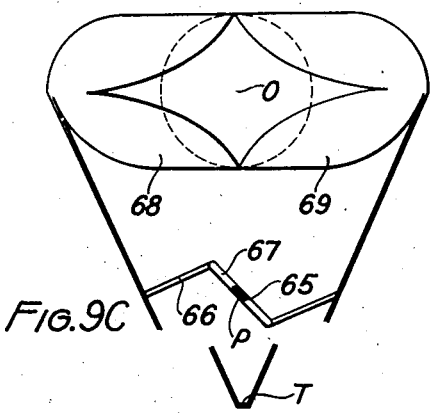
JOHN W. GALYON
INVENTOR
BY
ATTORNEYS

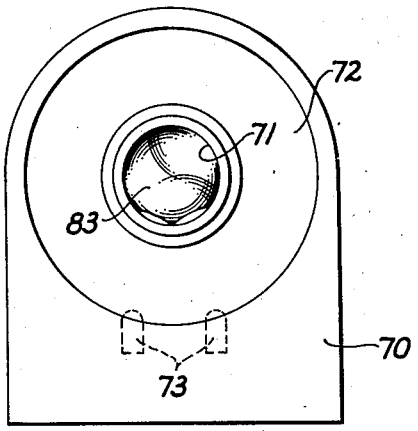
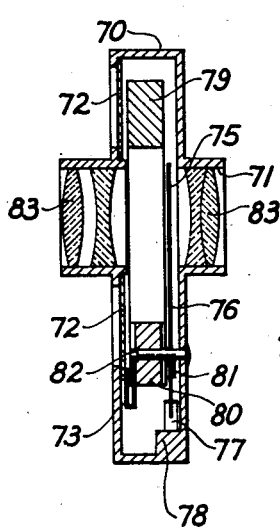
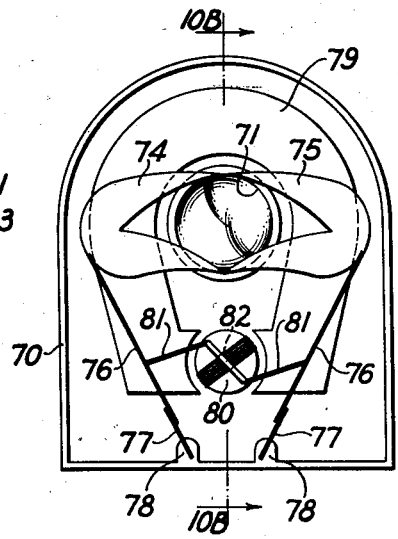

Patented July 2, 1940

2,206,086

UNITED STATES PATENT OFFICE 2,206,086

CAMERA LENS DIAPHRAGM

John W. Galyon, Springfield, Ill., assignor to Eastman Kodak Company, Rochester, N. Y., a corporation of New Jersey Application March 9, 1939, Serial No. 260,699

9 Claims. (Cl. 95—64)

This invention relates to apparatus for the control of light in making photographic exposures and more particularly to photographic apparatus for regulating the area of a light aperture to assure proper exposure under different conditions of illumination.

An object of the present invention is to provide an apparatus in which a light sensitive device automatically adjusts a light opening such as a camera lens diaphragm, to the value necessary for proper exposure under the circumstances of lighting, shutter speed, film speed, etc.

Another object of the invention is the provision of an adjustable diaphragm or aperture actuated by a photo electric cell and having a construction which is compact, rugged, and one which utilizes the motive power of the meter without subjecting the meter to additional stress or strain. This object is attained in brief, by mounting the aperture defining members, such as diaphragm blades, separate from the movable part of the meter.

A further object of the invention is to provide an automatic diaphragm adapted to be built as an assembled part of an interchangeable lens thereby facilitating the provision of different actual apertures to secure the same relative apertures.

An object of a somewhat different embodiment of my invention is to provide a separate attachment which may be mounted on or held in front of a camera objective to control the effective aperture thereof.

Other objects and advantages of the invention will be apparent from the following description when read in connection with the accompanying drawings in which:

Fig. 1 illustrates one embodiment of the invention.

Fig. 2 illustrates an embodiment of the invention incorporated in an attachment to be held in front of an ordinary camera objective.

Fig. 3 shows a side elevation of the arrangement shown in Fig. 2.

Fig. 4 shows a rear elevation of the arrangement shown in Fig. 2 with the rear cover removed.

Fig. 5 illustrates an embodiment of the invention simplified to permit easy mathematical consideration of the principle thereof.

Fig. 6 shows a preferred embodiment of the invention.

Fig. 7 is a graph showing the relation between the length OA and the angle $\theta$, shown in Fig. 5.

Fig. 8 is a graph showing the change in effective area of the diaphragm shown in Fig. 6 as the blades close.

Figs. 9A, 9B and 9C show correspondingly diaphragms to be used with interchangeable lenses of different focal lengths.

Figs. 10A, 10B and 10C show a particularly compact embodiment of the invention.

In Fig. 1 only the essential parts of the invention are shown. The various parts of the lens assembly are separated for easy visualization of the units. A camera, which may be either a still or motion picture camera is shown in perspective at 10 and is provided with an objective of which two components 11 and 12 are shown. The lens assembly includes a shutter 13 with a shutter speed setting lever 14 axially mounted between the lens components 11 and 12. The invention is equally applicable to cameras with focal plane shutters.

According to the invention there is provided a lens diaphragm including blades 15 and 16 which are adjustable to control the aperture. The blades 15 and 16 are mounted on supporting arms 17 and 18 which are carried by a U-shaped spring member 19 rigidly supported by a clamp 20, which clamp is preferably connected rigidly to the camera housing 10, but is shown separated therefrom for convenience.

As will be seen from the drawings, the aperture depends on the separation of the blades 15 and 16 and hence on the angle between the arms 17 and 18. This angle is controlled through pivots 21, connecting links 22, and a lever 23 by a galvanometer 24 upon which the lever 23 is mounted so as to rotate with the coil of the galvanometer. The galvanometer shown is of the moving coil type but any type may be used. The moving part will be referred to as the rotor—to mean either a moving coil or moving magnet. The degree of rotation of this galvanometer rotor 24 depends on the current flowing through the leads 25, which current is supplied from a photoelectric cell 26 through resistances 27 and 28. In the embodiment shown the resistance 27 is adjusted by, and in accordance with, the setting of the shutter control lever 14 and the resistance 28 may be adjusted to correspond to the speed sensitivity of the film used. However, it is to be understood that any of the known methods for adjusting photoelectric cell output in accordance with the shutter speed and film speed, such as by masking the area of the photoelectric cell 26, may be used instead of the resistance methods shown. The photoelectric cell 26 may, as shown, be pointed toward the subject so that the light incident thereon is substantially the same intensity as that incident on the lens 12. The intensity of the light reaching the aperture is proportional to this incident intensity. On the other hand, with proper calibration and with correction for known factors such as the whiteness of the subject, the device may be arranged so that the cell 20 faces the source of illumination. In this case, also, the light through the aperture has an intensity substantially proportional to that incident on the photoelectric cell.

It is well known that only a small current is available from suitable photoelectric cells and hence it is desirable that this current do no more work than is necessary. The construction provided by the present invention assures that the amount of work will be the minimum. It will be noted that the blades 15 and 16 are supported by the spring 19 and the galvanometer 24 supports only a minimum of weight, in fact, even the weight of the links 22 and the levers 23 is shared by the two pivots 21. Thus the galvanometer rotor 24 supports only a small amount of weight in excess of its own and the current therethrough merely has to overcome the tension of the spring 19 which can be made to have any desired amount. A construction of the blades 15, 16, and the connecting links 22 which I have found particularly practical, is shown in Figs. 2, 3, and 4.

The arrangements shown in Figs. 2, 3, and 4 involve the invention in the form of an attachment to be used over any lens of a given focal length. This arrangement comprises a housing 30 with an opening 31 through which light can pass to a camera objective not shown. The lower part of the front surface of the attachment is provided with a photoelectric cell 32 having some form of view defining means shown as baffles 34. According to the invention, the opening 31 has an adjustable aperture controlled by diaphragm blades 15 and 16. These blades are mounted in the same manner as in Fig. 1, as is apparent particularly from Fig. 4. In the arrangement shown, the output of the photoelectric cell 32 is connected directly through contacts 33 and 35 to the coil of the galvanometer 24. However, if desired, adjustable resistances may be inserted to permit use of the device with different shutter speeds and different film speeds. The magnetic field for the galvanometer coil 24 is provided by a magnet 36 shown as a permanent horse shoe magnet. In practice I have found it desirable to construct the blades 15 and 16 of thin metal foil and to use extremely fine aluminum wire or silk thread for the connecting links 37. These connecting links are passed through small loops 38 on the arms 17 and 18, which small loops correspond to the pivots 21 of Fig. 1.

The operation of the device is as follows:

When a photograph is being made, the amount of light transmitted to the lens is controlled by the aperture defining means 15 and 16. The setting of these blades depends on the amount of rotation of the needle 23 mounted on the galvanometer 24, which in turn depends on the amount of current coming from the photo-electric cell 32. By suitable arrangement (of the area of the photoelectric cell, the resistance in the circuit, the coil of the galvanometer 24, the shape of the pole pieces of this galvanometer, which pole pieces comprise the magnet 36, the length of the lever 23 and the connecting link 37, the tension and the rate of change of tension of the spring 19 and the amount of leverage provided by the arms 17 and 18) the response of the instrument to the intensity of the light incident on the cell 32, is arranged so that the area of the aperture is inversely proportional to the intensity of illumination falling on the cell so as to provide constant exposure. In practice, I have found it desirable to have this inverse proportionality not quite linear, due to the fact that, in general, scenes which are very bright are usually also very contrasty and hence require somewhat less exposure than less brightly illuminated scenes. This latter phenomenon is not my own discovery and incidentally is quite different from the phenomenon known as the failure of the reciprocity law of photographic exposures. On the other hand, for convenience in describing the principle of my invention, only the simple case where the area of the aperture should be inversely proportional to the intensity of the illumination will be considered.

This consideration is most easily described with reference to Fig. 5 wherein the spring 19 is replaced by a pivot at the point T and two springs 41 operating to separate the blades of the diaphragm 40. These blades 40 carry small projections 42 which press against the lever arms 43. The blades 40 are restrained by guides, not shown, to move only horizontally. The galvanometer needle and connecting links control the position of lugs 45 which are restrained by the guides 44 to move horizontally on the broken line 46. For purposes of mathematical computation various points on this diagrammatic arrangement are labeled with letters. The optic axis of the lens system passes through the point O. As the blades 40 move inward, i. e. toward each other, the intersection points M and N move vertically toward the point O making the area of the diaphragm smaller. The following mathematical facts are obvious from this Fig. 5.

Aperture = twice area $MBN = 2(BO)^2$ _____(1)
Length $BO = AO - AB$ _____(2)
Let $AB$ = constant $C_1$ _____(2)
Aperture = $2(AO - C_1)^2$ _____(3)

$$\frac{AO}{DP} = \frac{OT}{PT}$$

Let this equal a constant $C_2$
Let $EP$ (length of galvanometer arm) = $C_3$
Let $DE$ (length of connecting link) = $C_4$
Then by simple geometry, $$AO = C_2(DP) = C_2(C_3 \cos\theta + \sqrt{C_4^2 - C_3^2 \sin^2\theta}) \quad (4)$$

The relationship between the length AO and the angle as given by this equation is represented by the curve 50 in Fig. 7. The actual shape of this curve depends on the constants $C_2$, $C_3$ and $C_4$.

The relationship of aperture area to the length AO depends on the shape of the notches in the diaphragm blades 40. In Fig. 5, these blades 40 have rectangular notches with right angles at the point B; thus the aperture area is according to Equation 3. Thus Equations 3 and 4 give the relationship of area to the angle $\theta$.

As pointed out above, for automatic exposure control it is in general necessary to have the area of the lens aperture vary inversely with the intensity of the light incident on the lens. That is:

$$\text{Area} = \frac{C_5}{I}$$

where $C_5$ is a constant and $I$ is light intensity.

Since photoelectric cells respond approximately linearly i. e., current $i$ is proportional to intensity $I$, the aperture area should equal $$\frac{C_6}{i}$$

(where $C_6$ is a constant). This last relationship together with the one already established between area and angle $\theta$, gives the relationship between the current $i$ and the angle $\theta$ which is necessary to produce constant exposure. Reviewing each of the steps just outlined, it will be seen that this last relationship depends on the shape of the diaphragm blades and the constants $C_1$, $C_2$, $C_3$, and $C_4$. These constants determine how much and what part of the curve 50 is used as well as the shape of this curve.

In practice, when this relationship is computed for any set of constants $C_1$—$C_4$, the coil 24, the pole pieces of the galvanometer and the spring 19 (or 41) are arranged so that the response is in accordance with this relationship. This response is controlled in the usual manner employed in designing ammeters and galvanometers and involves the adjustment of the spring tension, the rate of change of this spring tension (as produced by the spring 19 or 41) and the shape of the pole pieces of the field magnet 36.

In actual practice, the point A is rigidly connected to the blades as shown in Figs. 1, 4 and 6. Similarly the point 45 is rigidly connected to the arm 43. Thus the points A and B move in an arc about the point T rather than horizontally. However, for all practical purposes such arrangements are mathematically equivalent to that shown in Fig. 5. If desired, the notches in the diaphragm blades may be curved to compensate for the slight arc through which the point B moves. In this case the notches are symmetrical about an arc rather than about the straight line BO.

Fig. 6 illustrates an arrangement which is particularly practical since with the diaphragm blades shown, the relationship between the angle $\theta$ and the current $i$ to give constant exposure is one for which it is easy to produce a corresponding meter response. The actual computations for this particular arrangement will be outlined in detail. This is however merely by way of example and is an application of the general rules given in connection with Fig. 5.

The example shown in Fig. 6 is for a diaphragm to be used with an f/3.5, 70 mm. focal length lens. The diameter of the aperture at maximum opening is 2 cm. With the corners of the lens cut off as shown in Fig. 6, the lens operates at an aperture effectively equal to f/4. In Fig. 6:

$AJ$ = constant $C_1$ = .5 cm.
$OT/PT$ = constant $C_2$ = 2
$EP$ = constant $C_3$ = .5 cm.
$DE$ = constant $C_4$ = .93 cm.

This last constant was selected so that starting from the point as shown in Fig. 6 the meter needle will be approximately at the angle $\theta$=45 degrees. Actually the diaphragm may open more than this but for the want of a better term, the position shown wherein the points M and N are on the periphery of the lens aperture is called the starting point. Forty-five degrees was selected by inspection of the curve 50, keeping in mind the effect of this curve. Thus the response will be utilizing the most desirable portions of the curve 50. The equation of this curve 50 developed in connection with Fig. 5 also holds for Fig. 6:

$$AO = C_2(C_3 \cos\theta + \sqrt{C_4^2 - C_3^2 \sin^2\theta}) \quad (4)$$

Therefore $$OJ = AO - C_1 = (\cos\theta + \sqrt{3.46 - \sin^2\theta} - .5) \text{ cm.}$$

The area of the aperture affecting the lens 47 is dependent on the shape of the curve 48 (i. e. the shape of the notch) and the length JO. The aperture area is twice the area M—K—L—N. The curve 48 happens to be one which is easy to make and the relationship between aperture area and the length OJ as shown in Fig. 8 by the curve 51, was determined graphically by plotting the arbitrarily selected curve 48 on graph paper and counting the squares thereunder. Any curve may be similarly arbitrarily chosen, but the results of the computations indicate that one of the general shape shown, gives the most useful relationship, i. e. one which results in the utilization of the satisfactory part of the curve 50 and which gives a uniform distribution of utility throughout the whole range used. Using the diaphragm shown, equal changes in angle $\theta$ produce the same factorial change in aperture area. In Fig. 6, the diaphragm is open to the so-called starting position indicated by the broken line 52 on the curve 51. When the blades are entirely clear of the lens 47, further movement causes no further changes as indicated by the flat portion of the curve 51 from the point 53 on. With the particular blades shown, the following relation, shown by the curve 51 holds.

| OJ | .2 | .4 | .6 | .8 | 1.0 | 1.2 | 1.4 | 1.6 | 1.8 | 2.0 cm. |
|---|---|---|---|---|---|---|---|---|---|---|
| Area | .008 | .040 | .096 | .184 | .304 | .468 | .672 | .940 | 1.300 | 1.830 sq. cm. |

From Equation 4 shown as curve 50 the following relationship holds.

| $\theta$ degrees | 45 | 50 | 60 | 70 | 80 | 90 | 100 | 110 | 120 | 130 | 140 | 150 | 160 |
|---|---|---|---|---|---|---|---|---|---|---|---|---|---|
| OJ | 2.00 | 1.91 | 1.72 | 1.52 | 1.32 | 1.14 | .98 | .84 | .72 | .63 | .55 | .49 | .45 |
| Area | 1.83 | 1.55 | 1.15 | .83 | .59 | .42 | .30 | .21 | .15 | .11 | .08 | .06 | .05 |

Computing from this data for the arrangement shown in Fig. 6 in which the starting point has an aperture f/4, the following relationship holds.

| Relative aperture | f/4 | f/5.6 | f/8 | f/11 | f/16 | f/22 |
|---|---|---|---|---|---|---|
| $\theta$ degrees | 45 | 66 | 87 | 108 | 129 | 151 |

This table indicates that the particular example of Fig. 6 is practically ideal as far as required angular sensitivity of the galvanometer is concerned. That is, the galvanometer must respond inverse logarithmically so that each diaphragm stop requires almost the same angular increment in the movement of the needle. It has been found by actual measurement that photoelectric cells commercially available deliver between 3 and 10 microamperes when the illumination is such that correct exposure will be obtained using an ordinary film, an aperture of f/4 and a shutter speed of 1/25 of a second. This example is given merely by way of showing about what sensitivity is required in the galvanometer.

For the blades to be entirely clear of the lens so that the full aperture of f/3.5 is available, OJ must be 2.54 cm.; this is determined graphically from the curve 48. However, with the arrangement shown in Fig. 6 the maximum value of OJ i. e. when θ equals 0, is 2.36 which graphically gives a maximum relative aperture of f/3.6. The present invention is not concerned with the various alternative types of meter designs. However, attention is drawn to the fact that the spring tension such as produced by spring 19 increases as the diaphragm closes and that this increase in tension aids in arranging that the response of the meter is inverse logarithmically, as required by the above equation.

Since the relative aperture of a lens is the ratio of its focal length to its diameter, lenses of different focal lengths require different sets of blades to give the same effect. The arrangements shown in Figs. 9A, 9B, and 9C are equivalent to each other when used with 35, 70, and 105 mm. lenses respectively. The arrangement shown in Fig. 9B is identical with that shown in Fig. 6. The lever 62 is provided with a slot 60 which is arranged to be coupled to a galvanometer. The blades of the diaphragm 63 and 64 and the connecting link 61 are exactly the same as those described in connection with Fig. 6. In Fig. 9A the needle 57 and the connecting link 56 are respectively just half the length of the needle 62 and the connecting link 61. The blades 58 and 59 are congruent to but have linear dimensions only half those of the blades 63 and 64. The needle 57 is provided with slot 55 which is the same size as the slot 60 to fit over the galvanometer needle coupling, not shown. The arrangement shown in Fig. 9C has the needle 67, the connecting link 66 and the blades 68 and 69 multiplied up from the corresponding ones shown in Fig. 9A by a factor 3. The slot 65 is similar to the slots 55 and 60. Any suitable means may be provided for bringing the galvanometer rotor into the position in which it will couple with the slot 55, 60 or 65 when the interchangeable unit including the lens and diaphragm is mounted on the camera to which the galvanometer is preferable connected rigidly.

Thus in the arrangements shown in Figs. 9A, 9B and 9C the constants $C_1$, $C_3$ and $C_4$ have all been multiplied by the conversion factor. This has many practical advantages over equivalent systems wherein the constant $C_2$ is multiplied by the conversion factor. If the constant $C_2$ were multiplied by a conversion factor, i. e. the ratio of OT to PT change, either the distance between O and P would be changed or the distance between O and T would be changed. The first alternative would require that the galvanometer which is in general fixed to the camera would have to be at an adjustable distance from the optic axis of the lens. The second alternative is equally impractical since if T is very far from P the arrangement would be cumbersome and if T approaches very close to P the blades of the diaphragm would move in very decided arcs rather than horizontally in front of the lens.

On the other hand, the arrangements shown in Figs. 9A, 9B, and 9C provide that the galvanometer may be fixed on the camera housing at a fixed distance from the optic axis of the lens and the diaphragm blades may be mounted with each interchangeable lens and fit directly over the galvanometer needle.

In Figs. 10A, 10B, and 10C, a particularly compact arrangement is shown wherein both the photoelectric cell 72 and the magnet 79 which provides the field for the galvanometer 80, surround the aperture 71.

In the specific arrangement the housing is designated as 70, the leads from the cell 72 to the galvanometer 80 as 73, the diaphragm blades as 74 and 75, the supporting arms as 76, separate springs for each arm as 77 clamped to the housing by clamps 78 and the connecting links to the galvanometer as 81 and 82. The notches in the diaphragm blades correspond to the straight sided notches of Figs. 1–5 but are curved to compensate for the arc through which the blades move. Obviously these compensating curves can be combined with the curves of Fig. 6 to give the effects of both.

As shown in Fig. 10B, this automatic diaphragm may be part of an interchangeable lens unit in which is an objective comprising components 83. Several alternative arrangements are possible: (1) the diaphragm control unit may be entirely separate from the lens as in Figs. 2, 3 and 4; (2) the cell and galvanometer may be on the camera housing, the diaphragm being part of the interchangeable unit as discussed in connection with Figs. 9A, 9B and 9C; (3) the lenses may be separately interchangeable and the diaphragm control unit built into the camera with either a manual adjustment such as resistance 28 in Fig. 1 or one controlled by some actuating member on the interchangeable lens mount to control the sensitivity of the unit in accordance with the focal length of the lens being used (4) both the lens and the diaphragm unit may be a non-interchangeable part of the camera.

Having thus described my invention in detail, shown several embodiments of it and given the mathematical theory thereof, I wish to point out that the invention is not limited to these specific arrangements but is of the scope of the appended claims.

I claim:

1. An adjustable diaphragm for regulating an aperture in accordance with the rotation of a galvanometer rotor which comprises two diaphragm blades movable from opposite sides across the aperture and in unison to and from the center thereof, two lever arms each supported at one end to rotate thereabout and each, at the other end, rigidly connected to and supporting one of the diaphragm blades, resilient means urging the lever arms and diaphragm blades away from the aperture centre and means operable by the galvanometer rotor and connected to the lever arms for moving said arms and blades against the force of the resilient means toward the aperture centre.

2. An adjustable diaphragm for regulating an aperture in accordance with the rotation of a galvanometer rotor which comprises two diaphragm blades movable from opposite sides across the aperture and in unison to and from the center thereof, two lever arms respectively and rigidly connected at one end to and supporting the blades, said lever arms being arranged with their other ends near each other and being supported to rotate substantially about said other ends, resilient means urging the lever arms and diaphragm blades away from the aperture centre and means located substantially symmetrically between the lever arms operable by the galvanometer rotor and connected to the lever arms for moving said arms and blades against the force of the resilient means toward the aperture centre.

3. An adjustable diaphragm for regulating an aperture at least partially in accordance with the intensity of light incident thereon comprising two diaphragm blades movable from opposite sides across the aperture and in unison to and from the center thereof, two lever arms each supported at one end to rotate thereabout and, each, at the other end, rigidly connected to and supporting one of the diaphragm blades, resilient means urging the lever arms and diaphragm blades away from the aperture center, a photoelectric cell exposed and responsive to light substantially proportional to that incident on the aperture, a galvanometer connected to the photoelectric cell, the galvanometer rotor being operable in accordance with the output of the cell and means operable by the galvanometer rotor and connected to the lever arms for moving said arms and blades against the force of the resilient means toward the aperture centre.

4. An aperture control unit to be positioned in front of a camera lens comprising a housing having a light transmitting tunnel therethrough, adapted to be positioned in axial alignment with the lens to form the aperture therefor, two diaphragm blades within the housing movable from opposite sides across the tunnel and in unison to and from the center thereof, two lever arms respectively and rigidly connected at one end to and supporting the blades, resilient members supporting the other ends of the lever arms and clamped to an inner wall of the housing, said resilient members urging the lever arms and diaphragm blades away from the tunnel center, a photoelectric cell mounted on the outside of the housing, a galvanometer supported within the housing and having a rotor operated in accordance with the output of the cell and means connected to the lever arms and operated by said rotor for moving the lever arms and blades against the force of the resilient members toward the tunnel center a distance proportional to the output of the photoelectric cell.

5. An interchangeable lens unit comprising a lens, a mount for the lens, an adjustable diaphragm carried by the mount for regulating the aperture of the lens in accordance with the rotation of a galvanometer rotor, said diaphragm consisting of two diaphragm blades movable from opposite sides across the aperture to and from the optic axis of the lens, two lever arms each supported by the mount to rotate about one end and each, at the other end, rigidly connected to and supporting one of the diaphragm blades, resilient means carried by the mount urging the lever arms and diaphragm blades away from the optic axis of the lens and means operable by the galvanometer rotor and connected to the lever arms for moving said arms and blades against the force of the resilient means toward said optic axis.

6. An interchangeable lens unit according to claim 5 in which the mount also carries the galvanometer rotor, a photoelectric cell and means connecting the rotor to the cell to operate the rotor in accordance with the output of the cell.

7. An adjustable diaphragm for one of a series of interchangeable lenses comprising a diaphragm according to claim 1 in which the length of the lever arms and the distance from the aperture centre of the galvanometer rotor are constant for all lenses of the series and the dimensions of the diaphragm blades and the dimensions of the means operable by the rotor are directly proportional to the focal length of said one of the lenses.

8. Diaphragm apparatus for use with a camera lens, comprising two diaphragm blades, a pivoted arm supporting each blade, a rotatable meter coil having a shaft, and means coupling the two arms, respectively, to diametrically opposed points on the shaft of said coil, whereby angular movement of said coil moves said blades without imposing other than a torsional load on said shaft.

9. In a photographic camera in which a meter coil having a shaft is supplied with a current proportional to the required exposure aperture, two diaphragm blades cooperating to define the exposure aperture, an arm pivotally carried by the camera and supporting each blade and means coupling the two arms, respectively, to diametrically opposed points on the shaft of said coil, whereby angular movement of said coil moves said blades without imposing other than a torsional load on said shaft.

JOHN W. GALYON.